US012291189B2

(12) United States Patent
Hancock et al.

(10) Patent No.: US 12,291,189 B2
(45) Date of Patent: May 6, 2025

(54) COMPENSATION METHOD FOR SHORTFALL OF ENGINE TORQUE

(71) Applicant: JAGUAR LAND ROVER LIMITED, Coventry (GB)

(72) Inventors: Matthew Hancock, Rugby (GB); William Harrison, Coventry (GB); Olivier Roques, Banbury (GB); Matt Sullivan, Hinkley (GB); Samuel Rios, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 118 days.

(21) Appl. No.: 17/920,760

(22) PCT Filed: Apr. 21, 2021

(86) PCT No.: PCT/EP2021/060457
§ 371 (c)(1),
(2) Date: Oct. 21, 2022

(87) PCT Pub. No.: WO2021/214186
PCT Pub. Date: Oct. 28, 2021

(65) Prior Publication Data
US 2023/0166716 A1 Jun. 1, 2023

(30) Foreign Application Priority Data
Apr. 21, 2020 (GB) ..................... 2005805

(51) Int. Cl.
*B60W 20/19* (2016.01)
*B60W 10/06* (2006.01)
(Continued)

(52) U.S. Cl.
CPC ............ *B60W 20/19* (2016.01); *B60W 10/06* (2013.01); *B60W 10/08* (2013.01);
(Continued)

(58) Field of Classification Search
CPC ...... B60W 10/04; B60W 10/06; B60W 10/08; B60W 20/10; B60W 20/19; B60W 20/20;
(Continued)

(56) References Cited

U.S. PATENT DOCUMENTS 11,110,908 B2 *  9/2021  Lee ....................... B60W 10/06
2008/0004780 A1  1/2008  Watanabe et al.
(Continued)

FOREIGN PATENT DOCUMENTS

| FR | 3025474 A1 | 3/2016 |
| GB | 2544763 A | 5/2017 |
| JP | 2019162955 A | 9/2019 |

OTHER PUBLICATIONS

Patents Act 1977: Combined Search and Examination Report under Sections 17 and 18(3) corresponding to Great Britain Application No. GB2005805.3, dated Aug. 21, 2020, 8 pages.
(Continued)

*Primary Examiner* — Russell Frejd
*Assistant Examiner* — Brandon Z Willis
(74) *Attorney, Agent, or Firm* — Reising Ethington P.C.

(57) ABSTRACT

Aspects of the present invention relate to a method and to a control system for a vehicle, the method comprising: receiving a torque request for an internal combustion engine configured to mechanically couple to a first axle of the vehicle; determining a shortfall relative to the torque request, dependent on torque providable by the engine; and providing an output to control an electric machine to provide a compensation torque configured to compensate for the shortfall, wherein the electric machine is mechanically coupled to a second axle of the vehicle.

13 Claims, 3 Drawing Sheets

(51) Int. Cl.
B60W 10/08 (2006.01)
B60W 30/188 (2012.01)

(52) U.S. Cl.
CPC ... B60W 30/188 (2013.01); *B60W 2510/0657* (2013.01); *B60W 2710/083* (2013.01)

(58) Field of Classification Search
CPC ........... B60W 20/40; B60W 30/18027; B60W 30/188; B60W 30/1882; B60W 2510/06; B60W 2510/0657; B60W 2510/0661; B60W 2510/08; B60W 2510/083; B60W 2510/084; B60W 2710/06; B60W 2710/0666; B60W 2710/0672; B60W 2710/08; B60W 2710/083; B60W 2710/085; Y02T 10/10; Y02T 10/62; B60K 6/20; B60K 6/24; B60K 6/44; B60K 6/448; B60K 6/485; B60K 6/52; B60K 2006/268
See application file for complete search history.

(56) References Cited

U.S. PATENT DOCUMENTS

| | | | |
|---|---|---|---|
| 2017/0282901 A1* | 10/2017 | Imamura | B60W 10/06 |
| 2018/0043881 A1* | 2/2018 | Hirasawa | B60W 20/13 |
| 2018/0312078 A1* | 11/2018 | Message | B60L 15/2063 |
| 2019/0184808 A1 | 6/2019 | Iwamitsu et al. | |
| 2020/0039503 A1 | 2/2020 | Bowman et al. | |
| 2020/0346635 A1* | 11/2020 | Wei | B60W 30/19 |
| 2021/0171015 A1* | 6/2021 | Artail | B60K 6/445 |

OTHER PUBLICATIONS

International Search Report corresponding to International Application No. PCT/EP2021/060457, dated Oct. 28, 2021, 5 pages.
Written Opinion corresponding to International Application No. PCT/EP2021/060457, dated Oct. 28, 2021, 7 pages.
European Office Action corresponding to application 21 722 120.9-1009, dated Mar. 2025, 7 pages.

* cited by examiner

COMPENSATION METHOD FOR SHORTFALL OF ENGINE TORQUE

TECHNICAL FIELD

The present disclosure relates to a compensation method for a shortfall of engine torque. In particular, but not exclusively it relates to a compensation method for a shortfall of engine torque in a hybrid electric vehicle.

BACKGROUND

An all-wheel drive hybrid vehicle architecture may comprise an internal combustion engine associated with an engine-driven axle and an electrical machine associated with an electrically-driven axle.

When an internal combustion engine is suddenly requested to provide a large amount of torque, an initial torque increase can be rapidly provided by adjusting the spark timing and/or fueling of the engine, after which the rate of torque increase will slow down due to the inertia of the current, slowly-changing air flow through the engine. This scenario may arise for example if a driver wishes to accelerate away quickly.

SUMMARY OF THE INVENTION

It is an aim of the present invention to address one or more of the disadvantages associated with the prior art.

Aspects and embodiments of the invention provide a control system, a system, a vehicle, a method, and computer software as claimed in the appended claims.

According to an aspect of the invention there is provided a control system for a vehicle, the control system comprising one or more controllers, wherein the control system is configured to: receive a torque request for an internal combustion engine configured to mechanically couple to a first axle of the vehicle; determine a shortfall relative to the torque request, dependent on torque providable by the engine; and provide an output to control an electric machine to provide a compensation torque configured to compensate for the shortfall, wherein the electric machine is mechanically coupled to a second axle of the vehicle.

An advantage is improved acceleration consistency, because the vehicle becomes as responsive in a parallel hybrid electric vehicle mode (engine on and coupled to wheels) as it is in an electric vehicle mode (engine off and decoupled from wheels), despite the greater inertia of the engine.

The control system may be configured to: determine whether the magnitude of the shortfall exceeds a threshold; and cause provision of the compensation torque when the difference exceeds the threshold.

A further electric machine may be provided. The further electric machine may be configured to mechanically couple to the first axle of the vehicle.

The control system may be configured to control an extent to which at least one of the electric machine and the further electric machine provides at least part of the compensation torque, based on whether torque from the other of the electric machine and the further electric machine is limited by a lash crossing protection function.

The control system may be configured to: when the electric machine provides at least part of the compensation torque, control the further electric machine to provide a further compensation torque to compensate for a shortfall in electric machine torque, and/or when the further electric machine provides at least part of the compensation torque, control the electric machine to provide a further compensation torque to compensate for a shortfall in further electric machine torque.

The shortfall in electric machine torque may be associated with a lash crossing protection function.

The control system may be configured to control an extent to which the further electric machine provides at least part of the compensation torque, based on whether the further electric machine is controllable to provide at least part of the compensation torque by removing negative generative torque.

The control system may be configured to: when the further electric machine is controllable to provide at least part of the compensation torque by removing negative generative torque, remove at least part of the negative generative torque to provide at least part of the compensation torque, and when the further electric machine is not controllable to provide at least part of the compensation torque by removing negative generative torque, increase positive torque of the electric machine to provide at least part of the compensation torque.

According to an aspect of the invention there is provided a system comprising the control system, the electric machine and the internal combustion engine.

The system may comprise the further electric machine.

According to an aspect of the invention there is provided a vehicle comprising the system, the first axle, and the second axle.

In some examples, the vehicle is configured to mechanically provide torque from the internal combustion engine to the first axle and from the electric machine to the second axle, but is not capable of mechanically providing torque from the internal combustion engine to the second axle and is not capable of mechanically providing torque from the electric machine to the first axle.

According to an aspect of the invention there is provided a method for a vehicle, the method comprising: receiving a torque request for an internal combustion engine configured to mechanically couple to a first axle of the vehicle; determining a shortfall relative to the torque request, dependent on torque providable by the engine; and providing an output to control an electric machine to provide a compensation torque configured to compensate for the shortfall, wherein the electric machine is mechanically coupled to a second axle of the vehicle.

The vehicle may comprise a further electric machine configured to mechanically couple to the first axle of the vehicle. The method may further comprise: determining whether the further electric machine is controllable to provide at least part of the compensation torque by removing negative generative torque; wherein the electric machine provides the compensation torque when the further electric machine is not controllable by removing negative generative torque; and wherein the further electric machine provides at least part of the compensation torque when the further electric traction is controllable by removing negative generative torque.

According to an aspect of the invention there is provided computer software that, when executed, is arranged to perform the method. According to a further aspect of the invention there is provided a non-transitory computer readable medium comprising computer readable instructions that, when executed by a processor, cause performance of any one or more of the methods described herein.

The one or more controllers may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs and/or in the following description, claims and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
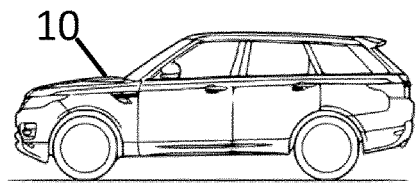
FIG. 1 illustrates an example of a vehicle.

FIG. 1 illustrates an example of a vehicle 10 in which embodiments of the invention can be implemented. In some, but not necessarily all examples, the vehicle 10 is a passenger vehicle, also referred to as a passenger car or as an automobile. In other examples, embodiments of the invention can be implemented for other applications, such as industrial vehicles.

The vehicle 10 may be a hybrid electric vehicle (HEV). If the vehicle 10 is an HEV, the vehicle 10 may be a full HEV or a mild HEV. Mild HEVs do not have an electric-only mode of propulsion, but an electric machine may be configured to provide torque assistance. Full HEVs have an electric-only mode of propulsion.

If the vehicle 10 is a HEV, the vehicle 10 may be configured to operate as a parallel HEV. Parallel HEVs comprise a torque path between the engine and at least one vehicle wheel, as well as a torque path between an electric machine and at least one vehicle wheel. The torque path(s) may be disconnectable by a torque path connector such as a clutch or transmission. Typically, parallel HEVs differ from series HEVs, because in series HEVs the purpose of the engine is to generate electrical energy and there is no torque path between the engine and vehicle wheels. However, some types of parallel HEVs may be configurable to operate as a series HEV, such as 'through-the-road' hybrids. In this case we may usefully describe such a hybrid vehicle as operating in a parallel HEV mode or in a series HEV mode, depending on whether torque is being delivered from the engine directly to the vehicle wheels.

Figure 2:
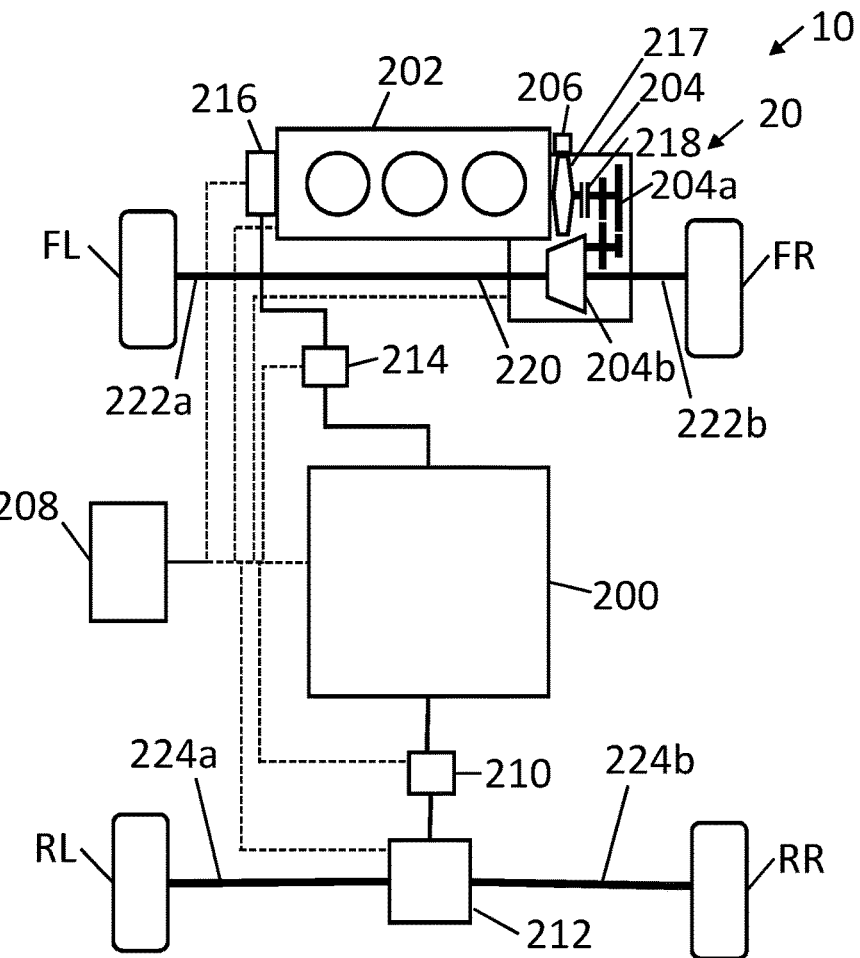
FIG. 2 illustrates an example of a system.

FIG. 2 illustrates an example system 20 for an HEV 10. The system 20 defines, at least in part, a powertrain of the HEV.

The system 20 comprises a control system 208. The control system 208 comprises one or more controllers. The control system 208 may comprise one or more of: a hybrid powertrain control module; an engine control unit; a transmission control unit; a traction battery management system; and/or the like.

The system 20 comprises one or more torque sources. A torque source refers to a prime mover, such as an engine, an electric machine, or the like. An electric machine is also referred to herein as an electric machine. The illustrated system 20 comprises an engine 202. The engine 202 is an internal combustion engine (ICE). The illustrated engine 202 comprises three combustion chambers, however a different number of combustion chambers may be provided in other examples.

The engine 202 is operably coupled to the control system 208 to enable the control system 208 to control output torque of the engine 202. The output torque of the engine 202 may be controlled by controlling one or more of: air-fuel ratio; spark timing; poppet valve lift; poppet valve timing; throttle opening position; fuel pressure; turbocharger boost pressure; and/or the like, depending on the type of engine 202.

The system 20 comprises a transmission 204 for receiving output torque from the engine 202. The transmission 204 may comprise an automatic vehicle transmission, a manual vehicle transmission, or a semi-automatic vehicle transmission. The transmission 204 may comprise one or more torque path connectors 218, a torque converter 217, and a gear train 204a. The gear train 204a is configured to provide a selected gear reduction in accordance with a selected gear of the vehicle 10. The gear train 204a may comprise five or more different selectable gear reductions. The gear train 204a may comprise at least one reverse gear and a neutral gear.

The system 20 may comprise a differential 204b which is a second gear train for receiving output torque from the gear train 204a. The differential 204b may be integrated into the transmission 204 as a transaxle, or provided separately.

The engine 202 is mechanically connected (coupled) or connectable (couplable) to provide positive torque to a first set of vehicle wheels (FL, FR) via a torque path 220. The torque path 220 extends from an output of the engine 202 to the transmission 204, then and then to first set of vehicle wheels (FL, FR) via a first axle or axles 222a, 222b. In a vehicle overrun and/or friction braking situation, negative torque may flow from the first set of vehicle wheels (FL, FR) to the engine 202.

The illustrated first set of vehicle wheels (FL, FR) comprises front wheels, and the axles 222a, 222b are front transverse axles. Therefore, the system 20 is configured for front wheel drive by the engine 202. In another example, the first set of vehicle wheels comprises rear wheels (RL, RR). The illustrated first set of vehicle wheels (FL, FR) is a pair of vehicle wheels, however a different number of vehicle wheels and axles could be provided in other examples.

In the illustrated system 20, no longitudinal (centre) driveshaft is provided, to make room for hybrid vehicle components. Therefore, the engine 202 is not connectable to a second set of rear wheels (rear wheels RL, RR in the illustration). The engine 202 may be transverse mounted to save space. In an alternative example, the engine 202 may be configured to drive the front and rear wheels.

A torque path connector 218 may be provided inside and/or outside a bell housing of the transmission 204. The torque path connector 218 is configured to connect and configured to disconnect the torque path 220 between the engine 202 and the first set of vehicle wheels (FL, FR). The torque path connector 218 may be a part of the torque converter 217 or gear train 204a, or may be a separate friction clutch. The system 20 may be configured to automatically actuate the torque path connector 218 without user intervention.

The system 20 comprises a first electric machine 216. The first electric machine 216 may be an alternating current induction motor or a permanent magnet motor, or another type of motor. The first electric machine 216 is located so that when the torque path 220 is disconnected from the first set of vehicle wheels (FL, FR), the first electric machine 216 is also disconnected. Alternatively, the first electric machine 216 may be located so that it remains connected to the first set of vehicle wheels (FL, FR).

The first electric machine 216 may be mechanically connected (coupled) or connectable (couplable) to the engine 202 via a belt or chain. For example, the first electric machine 216 may be a belt integrated starter generator (BISG). The first electric machine 216 and the engine 202 together form a torque source for the first set of vehicle wheels (FL, FR). In the illustration, the first electric machine 216 is located at an accessory drive end of the engine 202, opposite a vehicle transmission end of the engine 202. In an alternative example, the first electric machine 216 is a crankshaft integrated motor generator (CIMG), located at a vehicle transmission end of the engine 202. A CIMG may be capable of sustained electric-only driving unlike typical BISGs.

The first electric machine 216 is configured to apply positive torque and configured to apply negative torque to a crankshaft of the engine 202, for example to provide functions such as: boosting output torque of the engine 202; deactivating (shutting off) the engine 202 while at a stop or coasting; activating (starting) the engine 202; generating power for ancillary loads; and/or regenerative braking in a regeneration mode. In a parallel HEV mode, the engine 202 and first electric machine 216 may both be operable to supply positive torque simultaneously to boost output torque. The first electric machine 216 may be incapable of sustained electric-only driving. In an alternative example, the first electric machine 216 is not controllable to provide positive torque other than to start the engine 202. In further examples, a pinion starter 206 is provided for starting the engine 202.

FIG. 2 illustrates a second electric machine 212, also referred to as an electric traction motor, configured to enable at least an electric vehicle mode comprising electric-only driving. Another term for the second electric machine 212 is an electric drive unit. In some, but not necessarily all examples, a nominal maximum torque of the second electric machine 212 is greater than a nominal maximum torque of the first electric machine 216.

Even if the torque path 220 between the engine 202 and the first set of vehicle wheels (FL, FR) is disconnected, the vehicle 10 can be driven in electric vehicle mode because the second electric machine 212 is mechanically connected to at least one vehicle wheel.

The illustrated second electric machine 212 is configured to provide torque to the illustrated second set of vehicle wheels (RL, RR). The second set of vehicle wheels (RL, RR) comprises vehicle wheels not from the first set of vehicle wheels (FL, FR).

The illustrated second set of vehicle wheels (RL, RR) comprises rear wheels, and the second electric machine 212 is operable to provide torque to the rear wheels RL, RR via a second, rear transverse axle or axles 224a, 224b. Therefore, the illustrated vehicle 10 is rear wheel driven in electric vehicle mode. In an alternative example, the second set of vehicle wheels comprises at least one vehicle wheel of the first set of vehicle wheels. In a further alternative implementation, the second electric machine 212 is replaced with two electric machines, one for each rear vehicle wheel RL, RR.

The control system 208 may be configured to disconnect the torque path 220 between the engine 202 and the first set of vehicle wheels (FL, FR) in electric vehicle mode, to reduce parasitic pumping energy losses. For example, the clutch 218 may be opened. In the example of FIG. 2, this means that the first electric machine 216 will also be disconnected from the first set of vehicle wheels (FL, FR).

Another benefit of the second electric machine 212 is that the second electric machine 212 may also be configured to be operable in a parallel HEV mode, to enable multi-axle drive (e.g. all-wheel drive) operation despite the absence of a centre driveshaft.

In order to store electrical energy for the electric machines, the system 20 comprises an electrical energy storage means such as a traction battery 200. The traction battery 200 provides a nominal voltage required by electrical power users such as the electric machines.

The traction battery 200 may be a high voltage battery. High voltage traction batteries provide nominal voltages in the hundreds of volts. The traction battery 200 may have a voltage and capacity to support electric only driving for sustained distances. The traction battery 200 may have a capacity of several kilowatt-hours, to maximise range. The capacity may be in the tens of kilowatt-hours, or even over a hundred kilowatt-hours.

Although the traction battery 200 is illustrated as one entity, the function of the traction battery 200 could be implemented using a plurality of small traction batteries in different locations on the vehicle 10.

The first electric machine 216 and second electric machine 212 may be configured to receive electrical energy from the same traction battery 200 as shown.

Finally, the illustrated system 20 comprises inverters. Two inverters 210, 214 are shown, one for each electric machine. In other examples, one inverter or more than two inverters could be provided.

In an alternative implementation, the vehicle 10 may be other than shown in FIG. 2. For example, the first electric machine 216 may be connected through a clutch or gear to the engine 202, or may be located at the opposite end of the engine, possibly within the transmission 204 or on a driveshaft.

Figure 3A:
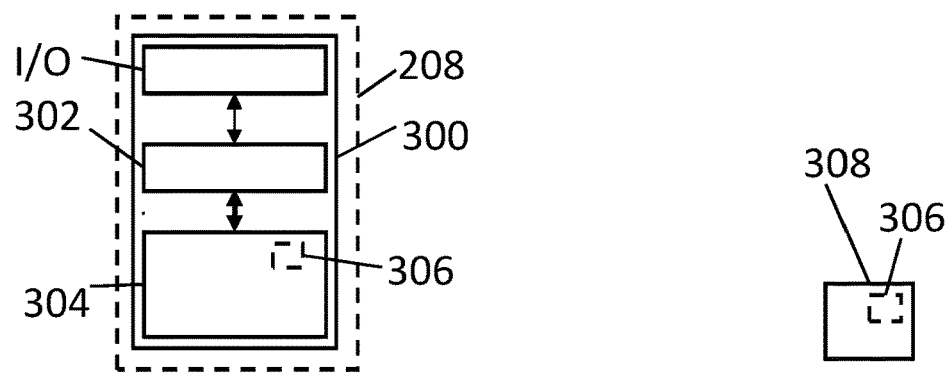
FIGS. 3A, 3B illustrate an example of a control system and of a non-transitory computer-readable storage medium.

FIG. 3A illustrates how the control system 208 may be implemented. The control system 208 of FIG. 3A illustrates a controller 300. In other examples, the control system 208 may comprise a plurality of controllers on-board and/or off-board the vehicle 10.

The controller 300 of FIG. 3A includes at least one processor 302; and at least one memory device 304 electrically coupled to the electronic processor 302 and having instructions 306 (e.g. a computer program) stored therein, the at least one memory device 304 and the instructions 306 configured to, with the at least one processor 302, cause any one or more of the methods described herein to be performed. The processor 302 may have an electrical input/output I/O or electrical input for receiving information and interacting with external components.

Figure 3B:
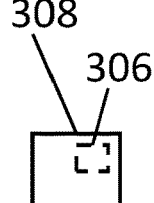

FIG. 3B illustrates a non-transitory computer-readable storage medium 308 comprising the instructions 306 (computer software).

The control system 208 may be configured to provide controller outputs to control output torque manipulate a variable (e.g. torque/speed) towards a setpoint. An example setpoint is a torque target or a speed target.

Output torque may be manipulated to satisfy at least one received torque request. A torque request may be a load-based torque request for the vehicle 10. This type of torque request may be referred to as a vehicle torque request or a total torque request for the whole vehicle, and is not specific to any particular torque source. The total torque request may be for a torque at the vehicle wheels. A load may be based on a driver torque demand (e.g. torque setpoint based on accelerator pedal depression APD), or autonomous driving torque demand, and/or dependent on a speed setpoint such as a cruise control speed setpoint.

Arbitration functions may be applied to change/increase the total torque request to satisfy a plurality of torque requests including load and requests from other vehicle subsystems. A shaping function may smooth the arbitrated total torque request.

The control system 208 may derive, from the shaped arbitrated total torque request, an engine torque request for controlling output torque of the engine, and/or an electric machine torque request(s) for controlling output torque of an electric machine or each electric machine, depending on a vehicle operating mode of the vehicle 10. A required torque split distribution function may control the derivation of the engine torque request and the electric machine torque request, wherein the electric machine is the second electric machine 212.

The required torque split may be a ratio. The torque split in this example is a front:rear torque split, between torque at the front and rear axles. The required torque split helps to maintain all-wheel drive balance of the vehicle 10 (front-biased, rear-biased, or 50:50). In some examples, the required torque split may vary dynamically. The required torque split may depend on variables such as: a driving dynamics mode; a terrain mode and/or a terrain type, vehicle speed; vehicle steering; lateral acceleration; and/or longitudinal acceleration, and/or other factors.

Shaping functions may be applied to smooth the engine and electric machine torque requests around a zero-crossing point (lash crossing), resulting in shaped engine and electric machine torque requests.

A system 20 such as the powertrain of FIG. 2 can be operated in a plurality of vehicle operating modes. In one or more vehicle operating modes, the engine 202 is deactivated and the torque path 220 between the engine 202 and the first set of vehicle wheels (FL, FR) is disconnected. In another one or more modes, the engine 202 is re-activated and the torque path 220 may be re-connected.

In electric vehicle mode, the engine 202 is in a deactivated state and the torque path 220 between the first set of vehicle wheels (FL, FR) and the engine 202 is disconnected. In an example, the effect of the combined deactivation and disconnection is that engine speed falls towards zero. Deactivation relates to the engine 202 producing no positive output torque or insufficient positive output torque for driving. Fuel injection may cease, to reduce fuel consumption.

In series HEV mode, the engine 202 is in an activated state but the torque path 220 is disconnected. The engine 202 and the first electric machine 216 generate electrical power, and the second electric machine 212 provides torque to the second set of vehicle wheels (RL, RR). One or both of the electric machines 212, 216 provides torque to vehicle wheels. If the second electric machine 212 is used, all-wheel drive is available.

In parallel HEV mode, the engine 202 is in an activated state and the torque path 220 is connected. In the activated state, fuel is combusted in the engine's combustion chambers, causing the engine 202 to provide positive output torque to the torque path 220. The engine 202 and the first electric machine 216 may optionally generate electrical power.

In an internal combustion engine mode, the engine 202 is in an activated state and the torque path 220 is connected. However, the first and second electric machines 212, 216 are not operable as motors to provide torque to the vehicle wheels. The engine 202 and the first electric machine 216 may optionally generate electrical power. The second electric machine 212 may optionally generate electrical power.

The vehicle operating mode may be selectable manually, semi-automatically, or automatically. A transition condition for changing to a vehicle operating mode that allows more charging than a current mode (e.g. exit electric vehicle mode) may require at least one of: a manual user selection; a traction battery state of charge falling below a threshold; a temperature being below a threshold (e.g. freezing weather); a change of driving dynamics mode; a change of terrain mode; an increase in power consumption due to a high load ancillary device being required to operate, such as an air conditioner unit or a heated windscreen; and/or the like.

A transition condition for changing to a vehicle operating mode that allows more net torque than a current mode and/or all-wheel drive (e.g. parallel HEV mode) may require at least one of: a manual user selection; a torque request rising above a threshold (e.g. kickdown function); a change of driving dynamics mode; a change of terrain mode; and/or the like.

A transition condition for changing to a vehicle operating mode that allows more electric driving than a current mode (e.g. one of the HEV modes or electric vehicle mode) may require at least one of: a manual user selection; a traction battery state of charge rising above a threshold; torque request falling below a threshold; a temperature being above a threshold; a change of driving dynamics mode; a change of terrain mode; and/or the like.

A driving dynamics mode refers to a mode that configures one or more of: a suspension setting; a throttle response setting; a gear shift point setting; a vehicle braking or traction control setting; a torque distribution setting; a torque shaping setting; a steering weighting setting; and/or other settings.

A terrain mode generally refers to vehicle modes optimized for driving over particular driving surfaces. An example of a terrain mode is an off-road terrain mode, arranged to optimize the vehicle for driving over off-road terrain such as may be required when traversing areas of grass, gravel, sand, mud or even crawling over rocks. Another example of a terrain mode is a surface vehicle optimization mode, arranged to optimize the vehicle for driving over low friction surfaces such as snow or ice covered surfaces, either on or off road. A vehicle may comprise a base on-road mode and/or a base surface vehicle optimization mode for regular surfaces, and may comprise a plurality of terrain modes for various surfaces and/or terrain.

A terrain mode and/or detection of a particular terrain type may configure one or more surface traction-related settings such as a differential locking setting and/or a traction control setting. Additionally, or alternatively, other settings could be adjusted such as: a suspension setting; a ride height setting; a suspension damper setting; a throttle response setting; a gear shift point setting; a vehicle braking or traction control setting; a torque distribution setting; a torque shaping setting; or a steering weighting setting. There may be overlap between driving dynamics modes and terrain modes. The settings may be predetermined or configurable.

A manual user selection may comprise use of a human-machine interface input device. The input device may comprise an engine start button. The input device may comprise a driving dynamics mode selector. The input device may comprise a terrain mode selector. In some examples, a terrain mode and/or driving dynamics mode may be changeable automatically.

Figure 4:
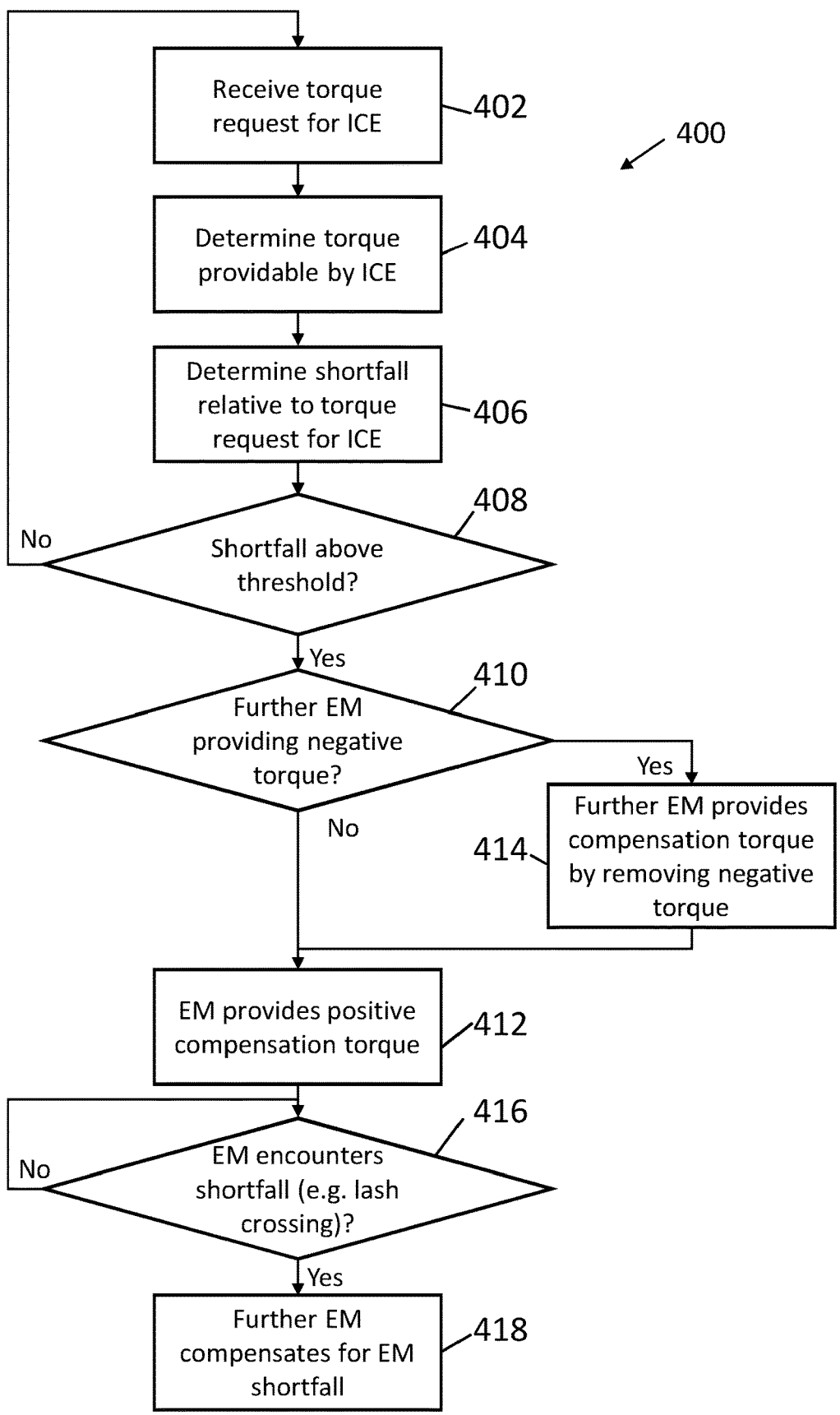
FIG. 4 illustrates an example of a method.

In accordance with an aspect of the invention, and as shown in part of FIG. 4, there is provided a computer-implemented method 400 for a vehicle 10, the method 400 comprising at least:

receiving a torque request for an engine 202 configured to mechanically couple to a first axle or axles 222a, 222b of the vehicle 10 (block 402);

determining a shortfall relative to the torque request, dependent on torque providable by the engine (block 406); and providing an output to control an electric machine to provide a compensation torque configured to compensate for the shortfall (block 412 or 414), wherein the electric machine is the second electric machine 212, mechanically coupled to a second axle or axles 224a, 224b of the vehicle 10. A compensation torque can be referred to as 'torque fill'.

The vehicle 10 may also comprise the above-mentioned first electric machine 216, which is also referred to herein as a further electric machine.

At block 402, the method 400 comprises receiving the torque request for the engine 202. In the examples described herein the torque request is for a positive increase of torque. The torque request may be the engine torque request (ICE torque request) as defined above, derived by the control system 208 or another controller from a received vehicle torque request. If the vehicle 10 is in the parallel HEV mode, both an engine torque request and an electric machine torque request are derived from the vehicle torque request, however this part of the method 400 is concerned with the engine torque request.

In some, but not necessarily all examples, the method 400 relates to vehicle acceleration. In the illustrated examples the torque request is an increasing torque request and the compensation torque is positive. Alternatively, the torque request may be a decreasing torque request and the compensation torque may be negative.

The control system 208 may be configured so that the maximum permissible value of the engine torque request is a torque that is achievable by the engine 202 in reference (e.g. steady state) conditions. The maximum permissible value of the engine torque request may be dependent on engine speed, for example.

Due to changing real-world conditions such as air density, constraints such as fuel injection restrictions, and several other factors, the output torque provided by the engine 202 may lag behind movement of the torque request. The amount of lag (shortfall) depends on the variable conditions. This results in inconsistent acceleration for a given load.

Block 404 of the method 400 comprises determining a torque parameter, dependent on torque providable by the engine 202 in response to the torque request. Known torque sensing techniques may be applied, including measurement, or advance virtual sensing using a calibrated software model. That is, the combustion engine torque may be either feedback based on measuring the engine torque, or may comprise a predicted torque. The torque parameter indicates the detected or expected torque at the vehicle wheels (FL, FR) or the output of the engine 202, based on the engine torque request of block 402.

Block 406 of the method 400 comprises determining a shortfall (difference) relative to the torque request. For example, block 406 may comprise determining the difference between the torque request and the torque parameter. In some examples, the shortfall may be a wheel torque shortfall, expressed from the perspective of the first set of vehicle wheels (FL, FR) by accounting for gearing. A nonzero shortfall indicates that the engine 202 may not be performing according to its steady state capability. The method 400 therefore proceeds to the next set of operations, which comprise controlling the first and/or second electric machine(s) 216, 212 to provide compensation torque, to compensate for the shortfall and improve acceleration consistency.

At block 408, the method 400 optionally comprises determining whether the shortfall is greater than a threshold, to prevent over-use of compensation torque. If the shortfall is less than the threshold, the method 400 terminates or loops back, for example to block 402. If the shortfall is greater than the threshold, the method 400 proceeds towards block 412. Intervening decision block 410 is described later. In an example implementation, block 408 determines whether the shortfall is greater than the threshold for greater than an activation time, to prevent use of compensation torque for short-duration transient shortfalls.

Block 412 comprises providing an output to control the electric machine to provide a required compensation torque configured to compensate for the shortfall. Compensating for the shortfall comprises cancelling (reducing) part of all of the shortfall. The compensation torque helps to reduce the shortfall quickly because an electric machine is highly responsive compared to an engine 202, and can speed up the overall responsiveness of the powertrain. The compensation torque is provided to the vehicle wheels at the same time as the engine 202 provides torque to the first set of vehicle wheels FL, FR. If the shortfall is a wheel torque shortfall, the compensation torque may be determined by converting the wheel torque shortfall into a torque request at the electric machine, accounting for gearing.

The shortfall is the difference between the torque request and the torque parameter. The required compensation torque may comprise a compensation torque setpoint (target), at least part of which is proportional to the size of the shortfall.

By providing the compensation torque in the parallel HEV mode, the vehicle 10 becomes as responsive in parallel HEV mode as it is in electric vehicle mode, despite the greater inertia of the engine 202.

In a potential implementation, block 412 may output a net electric machine torque request, the net torque request corresponding to the sum of the required compensation torque, and an existing electric machine torque request, enabling the electric machine to satisfy multiple torque requests.

An effect of applying compensation torque is that the ratio of torques at the first and second axles may temporarily deviate from the required torque split ratio. For example, adding compensation torque via the second electric machine 212 of FIG. 2 will bias the actual torque split rearwards relative to the required torque split.

In this example, block 412 is implemented by the second electric machine 212. This improves efficiency because the second electric machine 212 is more efficient at increasing positive torque than the first electric machine 216. However, in some implementations it may be appropriate to use the first electric machine 216.

The illustrated method 400 also provides optional examples of the relative extent (whether or by how much) to which the compensation torque is provided by each electric machine 212, 216. The illustrated method 400 provides an optional example of when the compensation torque may be provided by the first electric machine 216, referring to blocks 410 and 414. The illustrated method 400 further provides an optional example of when the compensation torque may be provided by a combination of the first electric machine 216 and the second electric machine 212, referring to blocks 414, 416 and 418.

At block 410, the method 400 comprises determining an extent to which at least one of the first or second electric machines 216, 212 will provide the compensation torque. More specifically, in this example the method 400 comprises determining whether the first electric machine 216 is controllable to provide at least part of the compensation torque by removing negative torque. The negative torque is associated with operation of the first electric machine 216 as a generator (generative torque). It is more efficient to remove negative torque from the first electric machine 216 than to increase positive torque of the second electric machine 212.

During vehicle acceleration, the first electric machine 216 may be applying negative torque as a load on the engine 202. Various reasons include, for example, charging to provide electrical energy to ancillary loads on the vehicle 10, or recharging the traction battery 202 for planned deployment of electric vehicle mode. Charging with the first electric machine 216 can increase engine torque, which can allow the engine 202 to perform more efficiently as the torque residency point can move closer to the engine's optimum fuel efficiency point for a given speed. The negative torque is removable to increase the net positive torque at the vehicle wheels, without detrimental effects.

If optional decision block 410 is satisfied, block 414 comprises controlling the first electric machine 216 to remove at least part of the negative torque to provide at least part, or all, of the compensation torque. If the removal of negative torque can only provide part of the compensation torque, the second electric machine 212 may provide the remaining required compensation torque.

If it is not possible to remove negative torque at block 410, or if optional blocks 410 and 414 are not included, the method 400 instead progresses to block 412 which controls the second electric machine 212 to provide the compensation torque. In this example, providing compensation torque comprises increasing positive torque of the second electric machine 212.

Although the above example refers to a binary decision at block 410 between the first or second electric machine 212, in other examples block 410 may control a ratio of how much of the compensation torque is provided by each electric machine.

The magnitude of compensation torque that is required by the first and/or second electric machine 212 may depend on a difference between a first gear ratio and a second gear ratio. The first gear ratio is indicative of the total gear reduction between the engine 202 and the first set of vehicle wheels FL, FR, and the second gear ratio is indicative of the total reduction between the electric machine that is providing the compensation torque, and its associated set of vehicle wheels. The first gear ratio may depend on a selected gear in the transmission 204. The first gear ratio may depend on a detected or modelled torque multiplication of the torque converter. The gear ratios may depend on wheel radius, for example if the wheels at different axles have different radii. In an example implementation, the shortfall (block 406) may be calculated as wheel torque, which is then converted into an electric machine torque request for compensation torque based on this difference in gear ratios. The total torque at the vehicle wheels including the applied compensation torque is equal to the total torque that would be at the vehicle wheels if the engine 202 were operating in steady state conditions.

At optional decision block 416, the method 400 comprises determining whether torque from the electric machine that is providing the compensation torque falls short of the required compensation torque. Although electric machines are typically highly responsive and encounter minimal shortfalls, a shortfall may occur while the electric machine is being limited by a lash crossing protection function, for example.

A lash crossing is a zero-crossing point of torque, caused by a torque reversal. A torque reversal can provide a jolt or jerk as lost motion of mechanical components is taken up, therefore the role of a lash crossing protection function is to limit the allowable rate of change of torque from the torque source that is undergoing a lash crossing, to reduce discomfort and improve durability. Shaping functions as described earlier can provide the functionality of lash crossing protection, for example. The lash crossing protection function is typically restrictive when torque is within a predetermined range of zero. Lash crossing protection slows down the responsiveness and effectiveness of the torque source undergoing a lash crossing.

If decision block 416 determines that the electric machine providing the compensation torque is encountering a shortfall, the method 400 at optional block 418 may control the further electric machine 216 to provide an additional, further compensation torque to compensate for the shortfall in electric machine compensation torque. If decision block 416 does not determine a shortfall, the method 400 may continue monitoring for a lash crossing while the compensation torque is applied.

A potential implementation of blocks 416 and 418 comprises: determining compensation torque provided by the electric machine; determining a shortfall between the provided compensation torque and the required compensation torque, for example due to a lash crossing; and provide an output to control the further electric machine 216 to provide an additional, further compensation torque configured to compensate for the shortfall of compensation torque.

Figure 5A:
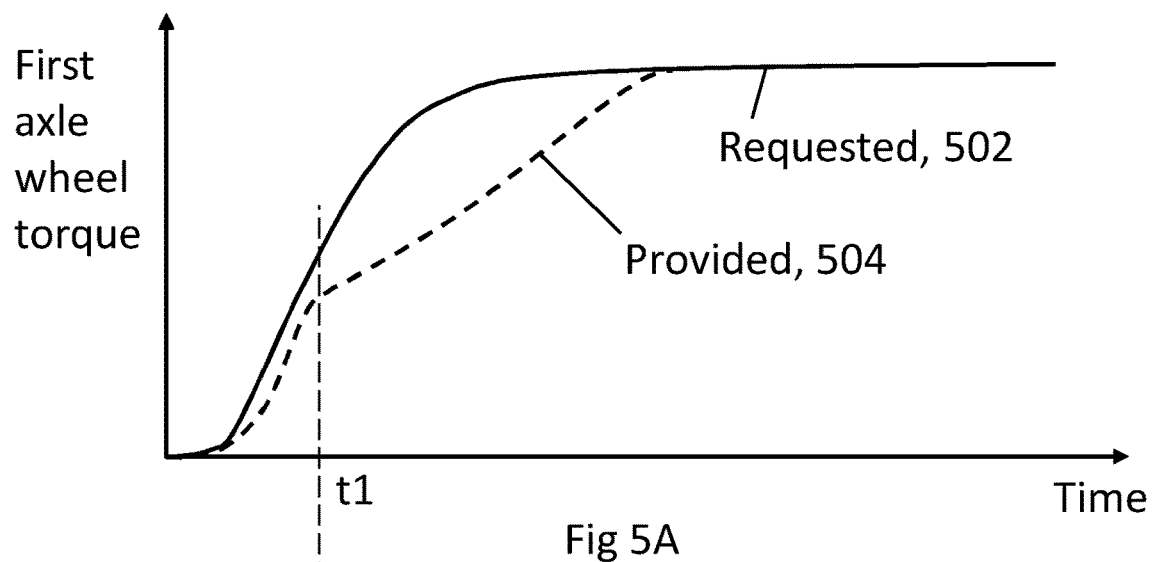
FIGS. 5A, 5B, 5C illustrate example graphs of torque required by an engine, an electric machine, and a further electric machine, respectively.
Figure 5B:
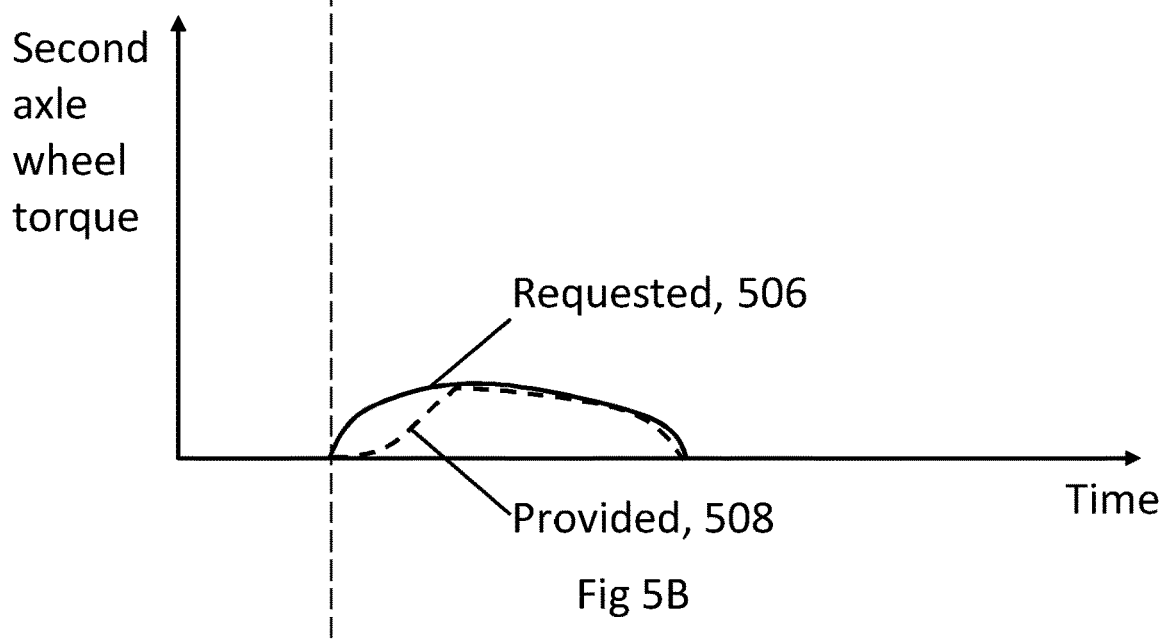
Figure 5C:
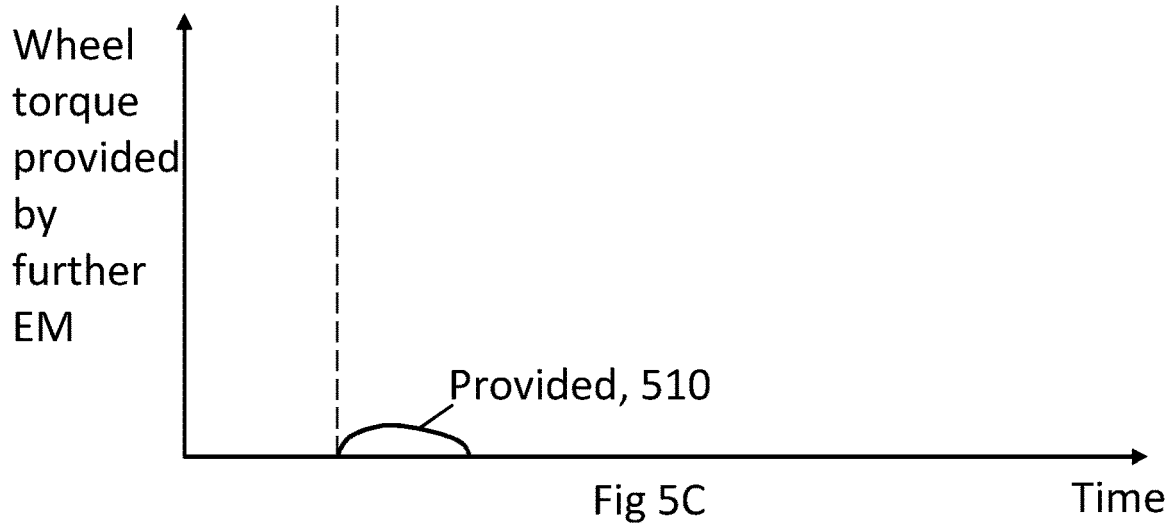

Torque-time graphs in FIGS. 5A, 5B, 5C illustrate an example implementation of the method 400 and in particular the method of blocks 412, 416 and 418, when a lash crossing occurs. FIG. 5A relates to first axle wheel torque, indicating torque requested and receivable at the first set of vehicle wheels (FL, FR) based on the engine torque request. FIG. 5B relates to second axle wheel torque, indicating torque requested and receivable at the second set of vehicle wheels (RL, RR) based on the electric machine torque request. FIG. 5C relates to the torque requested/receivable at the wheels (e.g. FL, FR) coupled to the further electric machine 216, when a lash crossing occurs in FIG. 5B.

In FIG. 5A, the solid line 502 represents the engine torque request from block 402, which steadily increases at a positive rate. The dashed line 504 represents the torque parameter based on torque providable by the engine 202, from block 404. The engine 202 is initially highly responsive by advancing spark timing and/or fueling, so prior to t1 the shortfall between lines 502 and 504 is small. However, once engine torque cannot be further increased by the above fast methods, the response of the engine 202 is slowed, primarily due to the inertia of the airflow through the engine 202. At time t1, the threshold shortfall of block 408 is exceeded so a compensation torque is applied.

FIG. 5B shows the compensation torque. In this example, but not necessarily all examples, the compensation torque is provided by the second electric machine 212. The solid line 506 represents the required compensation torque after a shortfall in engine torque is identified. The second electric machine 212 is controlled based on at least the required compensation torque. Due to a lash crossing protection function, the provided torque of the second electric machine 212 (dashed line 508) lags behind the required compensation torque.

FIG. 5C shows the further compensation torque as a solid line 510 in accordance with block 418 in FIG. 4. The further compensation torque is provided by the further (e.g. first) electric machine 216. The further compensation torque is configured to compensate for the further shortfall in the compensation torque provided by the second electric machine 212. The further shortfall is the difference between the requested compensation torque (506) and the provided compensation torque (508). The further shortfall in FIG. 5B is of a shorter duration than the shortfall of FIG. 5A, or in some cases may be of the same duration.

The summation, in terms of torque at the vehicle wheels, of the provided torques of FIGS. 5A, 5B, 5C, causes the net wheel torque of the vehicle 10 to match the engine torque request 502.

Although not shown in FIG. 4, other criteria may be checked when determining whether to provide compensation torque. For example, if the vehicle 10 is in an all-wheel drive mode, a required torque split may be in force. The compensation torque may be distributed between the first and second electric machines 216, 212 based on the torque split, or may be cancelled, if the control system 208 requires a specific torque split. An example of an all-wheel drive mode is parallel HEV mode with tractive torque provided by the second electric machine 212 and by the engine 202.

Another example criterion for reducing or cancelling compensation torque is when a state of charge and/or battery electrical power limit is below a threshold.

FIGS. 5A-5C illustrate an example in which the torque provided by the second electric machine lags behind the torque requested of the second electric machine, for example due to encountering a lash crossing protection function. However in some examples the second electric machine is able to meet the torque request 506 in which case no further compensation torque is required of the first electric machine. In such an example optional blocks 416 and 418 in FIG. 4 would not be required.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in FIG. 4 may represent steps in a method and/or sections of code in the computer program 306. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, the above-mentioned 'further electric machine' (blocks 410, 414, 418) may be the second electric machine 212 rather than the first electric machine 216, and the electric machine of blocks 412 and 416 may be the first electric machine 216 instead of the second electric machine 212.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system for a vehicle, the control system comprising one or more controllers, wherein the control system is configured to:
receive a torque request for an internal combustion engine configured to mechanically couple to a first axle of the vehicle;
determine a shortfall relative to the torque request, dependent on torque providable by the engine; and
provide an output to control an electric machine to provide a compensation torque configured to compensate for the shortfall, wherein the electric machine is mechanically coupled to a second axle of the vehicle, wherein a further electric machine is configured to mechanically couple to the first axle of the vehicle, and wherein the control system is configured to control an extent to which at least one of the electric machine and the further electric machine provides at least part of the compensation torque, based on whether torque from the other of the electric machine and the further electric machine is limited by a lash crossing protection function.

2. The control system of claim 1, configured to:
determine whether the magnitude of the shortfall exceeds a threshold; and
cause provision of the compensation torque when the magnitude of the shortfall exceeds the threshold.

3. The control system of claim 1, configured to:
when the electric machine provides at least part of the compensation torque, control the further electric machine to provide a further compensation torque to compensate for a shortfall in electric machine torque, and/or
when the further electric machine provides at least part of the compensation torque, control the electric machine to provide a further compensation torque to compensate for a shortfall in further electric machine torque.

4. The control system of claim 3, wherein the shortfall in electric machine torque is associated with the lash crossing protection function.

5. The control system of claim 1, configured to control an extent to which the further electric machine provides at least part of the compensation torque, based on whether the further electric machine is controllable to provide at least part of the compensation torque by removing negative generative torque.

6. The control system of claim 5, configured to:
when the further electric machine is controllable to provide at least part of the compensation torque by removing negative generative torque, remove at least part of the negative generative torque to provide at least part of the compensation torque, and
when the further electric machine is not controllable to provide at least part of the compensation torque by removing negative generative torque, increase positive torque of the electric machine to provide the compensation torque.

7. A system comprising the control system of claim 1, the electric machine and the internal combustion engine.

8. A vehicle comprising the system of claim 7, the first axle, and the second axle.

9. The vehicle of claim 8, wherein the vehicle is configured to mechanically provide torque from the internal combustion engine to the first axle and from the electric machine to the second axle, but is not capable of mechanically providing torque from the internal combustion engine to the second axle and is not capable of mechanically providing torque from the electric machine to the first axle.

10. A system comprising the control system of claim 1, the electric machine, the internal combustion engine, and the further electric machine.

11. A method for a vehicle, the method comprising:
receiving a torque request for an internal combustion engine configured to mechanically couple to a first axle of the vehicle;
determining a shortfall relative to the torque request, dependent on torque providable by the engine; and
providing an output to control an electric machine to provide a compensation torque configured to compensate for the shortfall,
wherein the electric machine is mechanically coupled to a second axle of the vehicle,
wherein a further electric machine is configured to mechanically couple to the first axle of the vehicle, and
wherein the method includes controlling an extent to which at least one of the electric machine and the further electric machine provides at least part of the compensation torque, based on whether torque from the other of the electric machine and the further electric machine is limited by a lash crossing protection function.

12. The method of claim 11, wherein the method comprises:
determining whether the further electric machine is controllable to provide at least part of the compensation torque by removing negative generative torque;
wherein the electric machine provides the compensation torque when the further electric machine is not controllable by removing negative generative torque; and
wherein the further electric machine provides at least part of the compensation torque when the further electric machine is controllable by removing negative generative torque.

13. A non-transitory, computer-readable memory storing computer software that, when executed, is arranged to perform a method according to claim 11.

* * * * *